United States Patent [19]

Iiyoshi

[11] 4,102,172
[45] Jul. 25, 1978

[54] CASTER FRAME

[75] Inventor: Shuichiro Iiyoshi, Tokyo, Japan

[73] Assignee: Yugen Kaisha Iiyoshi Seisakusho, Japan

[21] Appl. No.: 790,131

[22] Filed: Apr. 22, 1977

Related U.S. Application Data

[62] Division of Ser. No. 629,783, Nov. 6, 1975, abandoned.

[51] Int. Cl.² ............................................. B21K 1/26
[52] U.S. Cl. ................................... 72/254; 16/31 R
[58] Field of Search ...................... 72/254, 264, 324; 16/31 R, 31 A, 18, 39, 47, 38, 40

[56] References Cited

U.S. PATENT DOCUMENTS

| 2,073,066 | 3/1937 | Kalberer | 16/31 R |
| 2,415,243 | 2/1947 | Hickman | 72/254 |
| 3,442,005 | 5/1969 | Dornbos | 72/254 |

*Primary Examiner*—Lowell A. Larson
*Attorney, Agent, or Firm*—Wenderoth, Lind & Ponack

[57] ABSTRACT

A bar or section of uniform cross section, preferably of aluminum alloy, is cut to required lengths to provide blanks which can be used as caster frames with a minimum of machining. The caster frame consists essentially of a first portion defining a hollow space extending vertically therethrough for rotatably receiving a connector rod or pin by which the caster is to be attached to a desired article, and a second portion for supporting the axle of a wheel or wheels. Numerous modifications are possible.

4 Claims, 45 Drawing Figures

CASTER FRAME

This is a division of application Ser. No. 629,783, filed Nov. 6, 1975, now abandoned.

BACKGROUND OF THE INVENTION

This invention relates generally to casters or freely swiveling and rolling supports for furniture, machinery, trucks, and other articles. More specifically, the invention deals with improvements in the frame and associated parts of a caster.

As is well known, a caster comprises a wheel or set of wheels mounted in a frame free to swivel about a connector rod, pin or the like by or through which the caster is intended to be connected to a desired article. To facilitate the swiveling motion of the wheel or wheels, the connector has its axis arranged perpendicular to, but out of vertical register with, the wheel axis.

The caster frames have heretofore been made either by pressing of sheet-metal workpieces or by die casting. The frames produced by such conventional methods are subject to the disadvantage that they need considerable machining for mounting the connector and wheel axle in position thereon. The pressed or die-cast frames, moreover, do not seem to appeal to the contemporary sense of beauty.

There has also been known a caster construction incorporating a brake mechanism of the type acting directly upon the wheel or wheels to hold the article to which the casters are attached in a desired position of installation against the possibility of accidental displacement. This type of brake mechanism is objectionable because, if the article is installed on a slippery surface, the casters easily slide thereover with their brakes applied. Furthermore, if the article is unknowningly forced to move over a rough, rigid surface such as that of a concrete flooring while the caster brakes are applied, the wheels may suffer localized wear to such an extent as to result in serious impairment of their desired rolling movement.

SUMMARY OF THE INVENTION

It is a major object of this invention to provide a caster which is easy and economical to manufacture and which is appealing aesthetically.

Another object of the invention is to provide a caster having a frame which can be mass-produced out of a continuous bar-like stock material, or section, made as by extrusion of metal or plastics material.

A further object of the invention is to provide a caster wherein the frame is adaptable for use with either a single or dual wheel which may or may not be enclosed within the frame.

A still further object of the invention is to provide a caster including a chocking mechanism which thoroughly overcomes the deficiencies of the conventional caster brake mechanism pointed out previously.

With these and other objects in view this invention is directed, in brief, to the provision of a caster having an upstanding connector and at least one wheel mounted in a frame via an axle so as to swivel about the axis of the connector. Characteristically, the frame is formed by transversely cutting a shaped bar-like stock material of uniform cross-sectional shape. In its simplest form the frame comprises a first portion having a hollow space extending vertically therethrough for rotatably receiving the connector, and a second portion for supporting the axle of the wheel.

In preferred embodiments of the invention hereinafter presented, a variety of extruded sections of aluminum alloy or the like are employed as the shaped bar-like material. The extruded sections are cut to required lengths to provide blanks which can be turned into the desired frames with a minimum of machining. The assemblage of the complete caster is also possible with little or no use of tools.

The features which are believed to be characteristic of this invention are set forth in particular in the appended claims. The invention itself, however, both as to its organization and manner of assemblage and operation, together with the further objects and advantages thereof, will become apparent in the course of the following description of several preferred embodiments read in connection with the accompanying drawings in which like reference characters refer to like parts throughout the several views.

DETAILED DESCRIPTION

Figures 1, 2, 3:
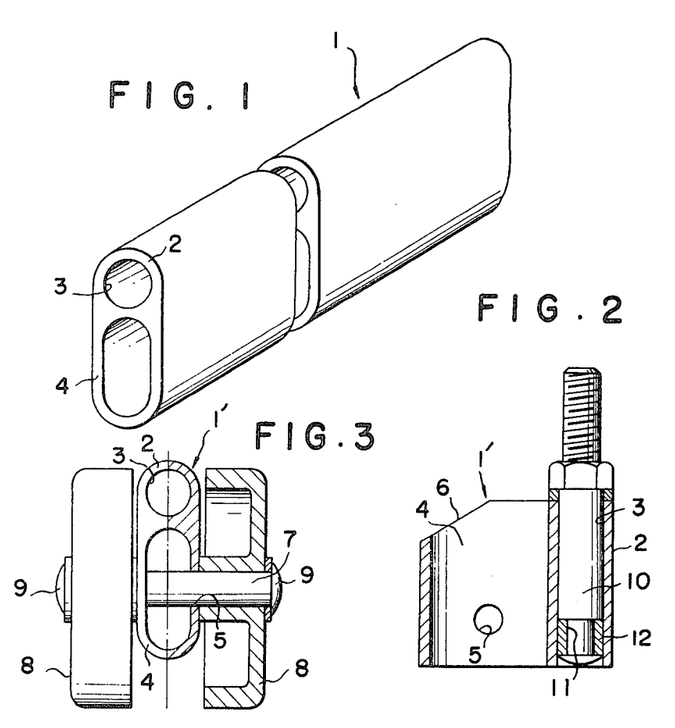
FIG. 1 is a perspective view of a frame blank as severed from a continuous length of extruded section, the frame blank being intended to be machined into a caster frame for use in a first preferred embodiment of the invention.
FIG. 2 is a vertical, longitudinal section view of the machined caster frame with a connector rod shown fitted in position therein.
FIG. 3 is a plan view, half in horizontal section, of a caster produced by use of the frame of FIG. 2, the view not showing the connector rod.

In FIGS. 1 to 5, inclusive, the invention is shown adapted for a caster of type having a pair of wheels which are completely exposed. With reference to FIG. 1 the numeral 1 denotes an extruded section of, typically, aluminum alloy, which is cut to a required length to provide a blank for the caster frame according to the invention.

The extruded frame blank is relatively flat, constant in width, and has rounded longitudinal or vertical edges. The frame blank consists essentially of a first portion 2 defining a hollow space 3 of circular cross section along one of the rounded edges, and a second portion 4 which is also shown to be hollow. If desired, the second portion 4 can be made solid.

This frame blank is to undergo some slight machining for use as the caster frame 1' seen in FIGS. 2 to 5, with its severed ends directed upwardly and downwardly, respectively. The machining includes the formation of axle holes 5 in register through the second portion 4. Moreover, if desired, the second portion 4 may be chamfered as indicated at 6 in FIG. 2.

For assemblage of the complete caster a wheel axle 7 may be inserted into and through the axle holes 5 in the second portion 4 of the frame 1'. The pair of wheels 8 are then mounted on opposite ends of the axle 7, with the axle being shown headed at 9 to prevent detachment of the wheels. A connector rod or pin 10 is then inserted into the hollow space 3 in the first frame portion 2.

It will be observed from FIG. 2 that the connector rod 10 has an annular groove 11 formed thereon adjacent its bottom end, and in this groove there is slidably fitted a retainer ring 12 that is secured to the first frame portion 2 to prevent detachment of the connector rod. It is of course understood that the connector rod 10 is rotatable relative to the frame 1'. The exposed top end portion of this connector rod is shown to be threaded for ready connection of the caster to furniture or other articles.

Figure 4:
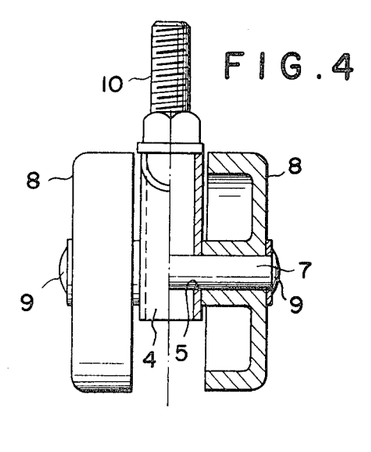
FIG. 4 is an end elevational view, half in vertical section, of the complete caster representing the first preferred embodiment of this invention.
Figure 5:
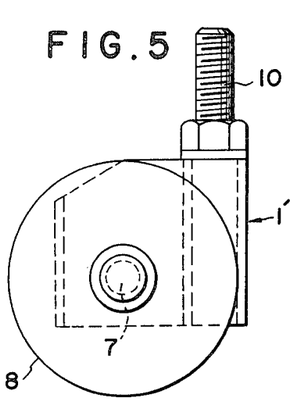
FIG. 5 is a side elevational view of the caster of FIG. 4.

FIGS. 4 and 5 illustrate the completed caster according to the invention. The pair of wheel 8 are not only rotatable about the axis of the axle 7 but free to swivel about the axis of the connector rod 10 arranged perpendicular to, and out of vertical register with, the axle.

Figure 6:
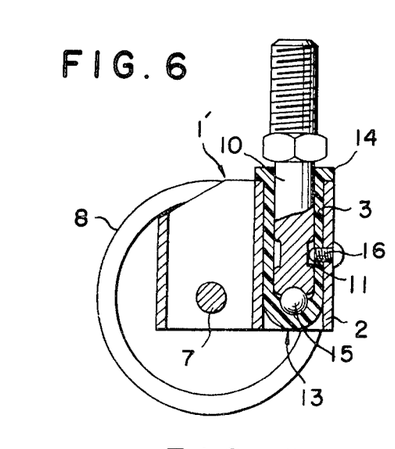
FIG. 6 is a vertical sectional view showing alternative means for supporting the connector rod in the caster of FIGS. 4 and 5.
Figure 7:
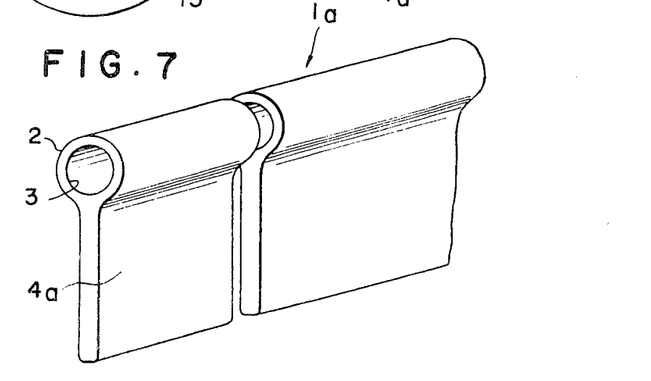
FIG. 7 is a view corresponding to FIG. 1 and showing a slightly modified example of the frame blank.

FIG. 6 is an illustration of alternative means for rotatably supporting the connector rod 10 in the hollow space 3 of the first frame portion 2. Snugly fitted in the hollow space 3 is a bearing 13 (hereinafter referred to as the connector bearing) of semirigid synthetic resin with an antifriction property and in the shape of a hollow, open-top cylinder with a flange 14 on its top end. After inserting this connector bearing fully into the hollow space 3, a ball 15 of steel or like rigid material is placed upon the bottom of the connector bearing. The connector rod 10 is then inserted into the bearing so as to rest upon the ball 15. Any accidental detachment of the connector rod 10 can be prevented as by a screw 16 passing through the first frame portion 2 and connector bearing 13 to engage in the annular groove 11 adjacent the bottom end of the rod.

The arrangement of FIG. 6 is preferable because the connector rod will make smoother rotation relative to its bearing 13 to permit swiveling of the wheels 8. The ball 15 is effective to bear the axial thrust of the connector rod.

Figure 8:
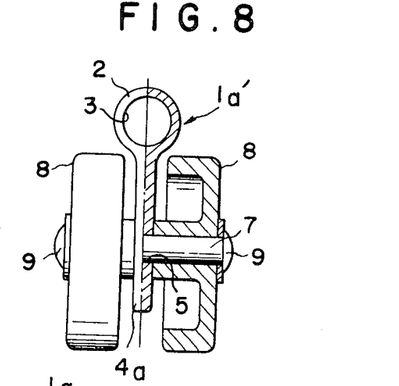
FIG. 8 is a plan view, half in horizontal section, of a caster produced by use of the frame blank of FIG. 7, the view not showing the connector rod.
Figure 9:
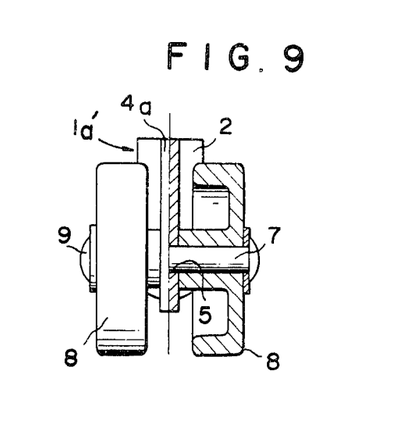
FIG. 9 is an end elevational view, half in vertical section, of the caster of FIG. 8, the view also not showing the connector rod.
Figure 10:
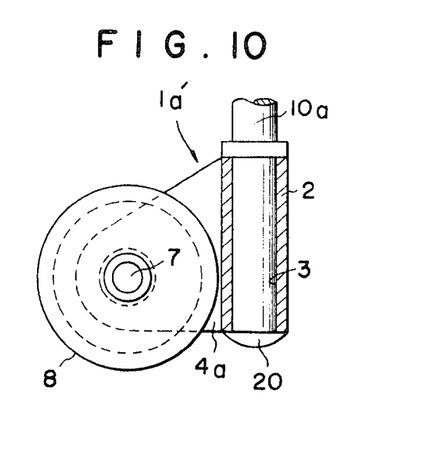
FIG. 10 is a side elevational view, partly in vertical section, of the complete caster of FIGS. 8 and 9.

FIGS. 7 to 10, inclusive, illustrate a slight modification of the preceding embodiment of the invention. An extruded section 1a shown in FIG. 7 differs from the section of FIG. 1 only in that the second portion 4a of the former is solid and thinner than the first portion 2. The frame blank severed from this extruded section 1a has the axle hole 5 formed through its second portion 4a for use as the caster frame 1a' as shown in FIGS. 8 to 10.

As shown particularly in FIG. 10 by way of example, the second portion 4a of this frame blank can be machined into any suitable shape with a view to an aesthetic appeal. It will also be noted from FIGS. 8 to 10 that the this caster can be assembled in much the same way as the caster of FIGS. 2 to 5, only with a difference in the measure taken to prevent detachment of a connector rod 10a out of the hollow space 3 in the first frame portion 2. The bottom end of the connection rod is headed at 20 as seen in FIG. 10.

Figures 11, 12, 13, 14, 15:
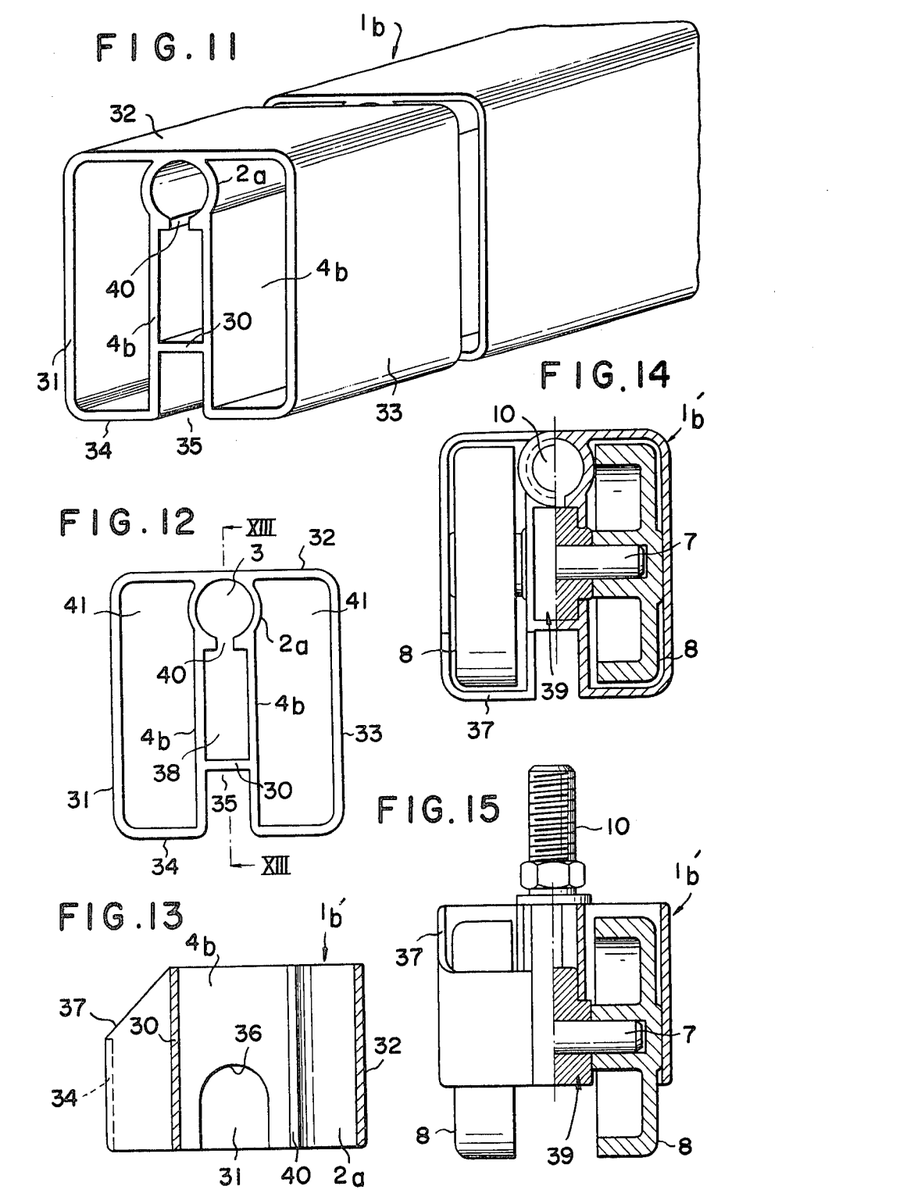
FIG. 11 is a view corresponding to FIG. 1 and showing a frame blank to be machined into a caster frame for use in another preferred embodiment of the invention.
FIG. 12 is a plan view of the frame blank of FIG. 11.
FIG. 13 is a vertical sectional view of the machined caster frame, taken substantially along the plane of line XIII—XIII in FIG. 12.
FIG. 14 is a plan view, half in horizontal section, of a caster produced by use of the frame of FIG. 13, the view not showing the connector rod.
FIG. 15 is an end elevational view, half in vertical section, of the caster of FIG. 14 complete with the connector rod.

FIGS. 11 to 22, inclusive, illustrate another preferred embodiment of the invention as adapted for a caster having a pair of wheels which are largely enclosed within a frame. FIG. 11 shows a frame blank severed from an extruded section 1b.

As more clearly seen in FIG. 12 the extruded frame blank is of substantially rectangular cross section, integrally comprising the first portion in the shape of a hollow cylinder 2a, the second portion in the form of a pair of parallel spaced inner walls 4b with a web 30 therebetween, and four outer walls 31, 32, 33 and 34. Parts of the inner walls 4b and the web 30 coact to define a channel 35 on the outer wall 34 for ornamental purposes.

For use of this frame blank as a caster frame 1b' depicted in FIG. 13, a pair of arched recesses 36 may be machined in corresponding positions at the bottom ends of the inner walls 4b. If desired, the frame blank may further be chamfered at 37 so as to leave the web 30 intact. The chamfer angle may be about 45°.

With reference again to FIG. 12 and also to FIGS. 14 to 16 there is arranged centrally of the caster frame 1b' a hollow space 38 for accommodating the bearing 39 of the axle 7 (hereinafter referred to as the axle bearing). It should be noted that this space 38 is bounded by the aforesaid second portion of the caster frame. The first portion or cylinder 2a, of course, defines therein the hollow space 3 intended to accommodate a connector bearing 13a. A slot 40 is formed longitudinally or vertically in the intervening wall between the spaces 3 and 38 for purposes described later. On opposite sides of the first and second frame portions a pair of spaces 41 are bounded by the outer walls 31 to 34 for accommodating the respective wheels 8.

Figures 16, 17, 18, 19, 20, 21, 22, 23:
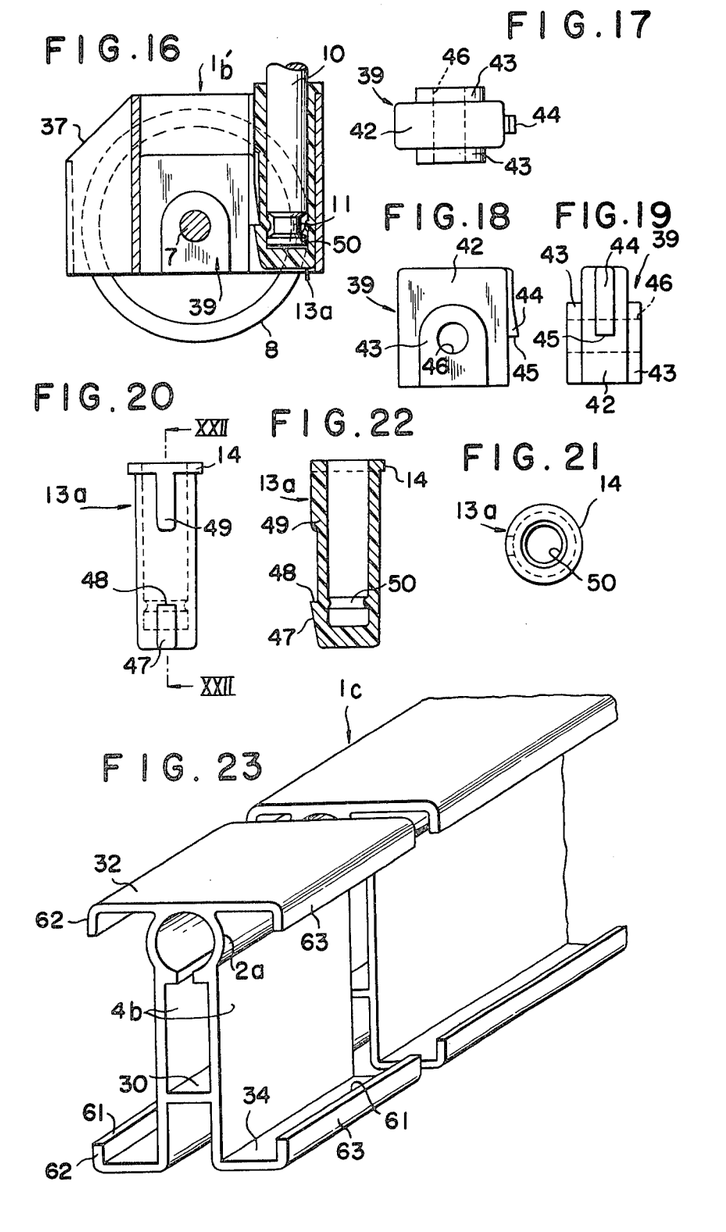
FIG. 16 is a vertical sectional view of the caster of FIG. 15, in which the connector rod is shown fragmentarily.
FIG. 17 is a top plan view of an axle bearing used in the caster of FIGS. 14 to 16.
FIG. 18 is a side elevational view of the axle bearing of FIG. 17.
FIG. 19 is a right-hand end elevational view of the axle bearing of FIG. 17.
FIG. 20 is a side elevational view of a connector bearing used in the caster of FIGS. 14 to 16.
FIG. 21 is a top plan view of the connector bearing of FIG. 20.
FIG. 22 is a sectional view taken along the plane of line XXII—XXII in FIG. 20.
FIG. 23 is a view similar to FIG. 11 but showing a slightly modified example of the frame blank.

FIGS. 17 to 19 illustrate the configuration of the axle bearing 39 to be installed in the space 38 of the caster frame 1b'. The axle bearing has a body 42 shaped and sized to fit snugly in the space 38. On opposite lateral faces of the body 42 there are formed a pair of ears 43 corresponding in shape and size to the arched recesses 36 in the inner walls 4b. Formed on one of the other lateral faces of the body 42 is a sloping ridge 44 extending downwardly from the top of the body and terminating short of its bottom end to provide a bottom edge 45 used for purposes hereinafter made apparent. The ridge 44 has a width to fit in the slot 40 of the caster frame 1b'. An axle hole 46 extends through the body 42 and ears 43.

As shown in detail in FIGS. 20 to 22 the connector bearing 13a to be installed in the space 3 of the caster frame 1b' is also in the shape of a hollow, open-top cylinder which can be made of semirigid synthetic resin. The connector bearing 13a includes the flange 14 on its top end, and a short sloping ridge 47 extending upwardly from its bottom end to provide a top edge 48 intended for engagement with the bottom edge 45 of the ridge 44 on the axle bearing 39. The ridge 47 also has a width to fit in the slot 40 of the caster frame 1b'. Another ridge 49 of the same width as the ridge 47 may be formed under the flange 14 for engagement in the slot 40. The hollow in the connector bearing 13a has a constriction 50 adjacent its bottom end for engagement in the annular groove 11 in the connector rod 10.

For assemblage of the complete caster the axle 7 may first be inserted into and through the hole 46 in the axle bearing 39. The pair of wheels 8 are then fixedly mounted on the projecting ends of the axle 7. The axle bearing 39 complete with the axle 7 and wheels 8 is then inserted into the central space 38 of the caster frame 1b' from below, with its ears 43 engaged in the respective recesses 36 in the inner walls 4b and with its ridge 44 engaged in the slot 40, as will be best understood from a consideration of FIG. 16. The wheels 8 are now substantially enclosed in the spaces 41 bounded by the outer walls 31 to 34 of the frame.

The connector bearing 13a is succeedingly inserted fully into the space 3 of the frame from above, with its ridge 47 fitted in the slot 40. Since then the top edge of this ridge 47 engages the bottom edge 45 of the ridge 44 on the axle bearing 39 as shown in FIG. 16, the axle bearing and connector bearing are locked in position on the caster frame 1b' against accidental dislodgement. The grooved end of the connector rod 10 is then inserted into the connector bearing 13a so that the annular groove 11 thereon will engage the constriction 50 of the bearing.

It should be appreciated that the caster of FIGS. 11 to 22 is assembled without use of tools.

Figures 24, 25, 26, 27, 28:
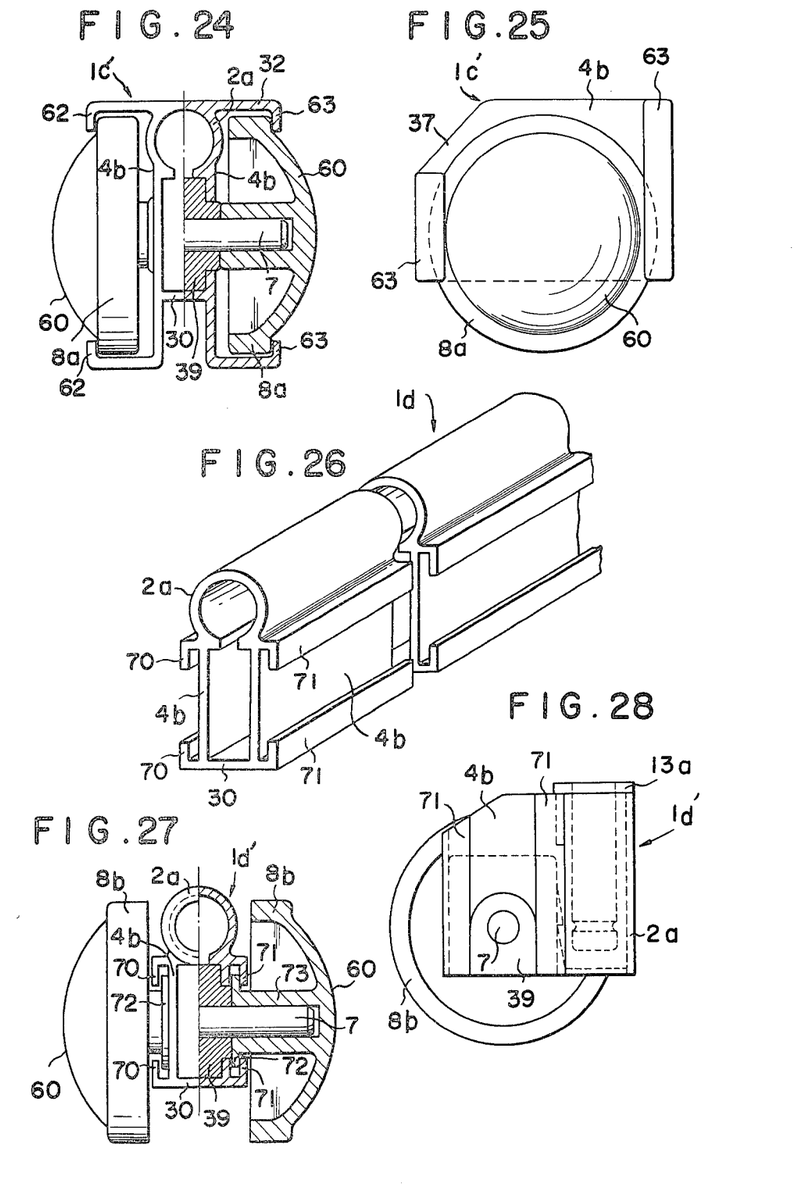
FIG. 24 is a plan view, half in horizontal section, of a caster produced by use of the frame blank of FIG. 23, the view not showing the connector rod.
FIG. 25 is a side elevational view of the caster of FIG. 24.
FIG. 26 is a view similar to FIG. 11 but showing another modification of the frame blank.
FIG. 27 is a plan view, half in horizontal section, of a caster produced by use of the frame blank of FIG. 26, the view not showing the connector rod.
FIG. 28 is a side elevational view showing the caster of FIG. 27 with one of its wheels removed.

FIGS. 23, 24 and 25 illustrate a slight modification of the FIGS. 11 to 22 embodiment, which is adapted to incorporate a pair of wheels 8a having convex outer faces 60. Shown in FIG. 23 is a frame blank as severed from an extruded section 1c, with the frame blank being slightly reshaped as in the foregoing into a caster frame 1c' of FIGS. 24 and 25. The frame comprises the hollow cylinder 2a, the inner walls 4b with the web 30 therebetween, and the opposed pair of outer walls 32 and 34, which are of exactly the same arrangement as their counterparts in the frame 1b' of the preceding embodiment.

However, the outer walls 31 and 33 of the preceding embodiment are widely apertured at 61 so as to leave pairs of flange-like portions 62 and 63 on the outer walls 32 and 34. These pairs of flange-like portions are each directed toward each other so as to embrace the outer, circumferential edges of the wheels 8a, as best seen in FIG. 24, and the convex outer faces 60 of these wheels are permitted to protrude outwardly through the apertured walls.

Although not illustrated in FIGS. 24 and 25, the connector and its bearing for use in this caster are assumed to be of exactly the same design as those designated 10 and 13a, respectively, in the preceding embodiment. Other details of construction, operation and manner of assemblage are also exactly as previously set forth in conjunction with FIGS. 11 to 22.

In another modification of the FIGS. 11 to 22 embodiment, shown in FIGS. 26, 27 and 28, a caster frame 1d' which has been severed from an extruded section 1d and machined as aforesaid, is of such constructon that a pair of wheels 8b are completely exposed. The caster frame 1d' comprises the first portion in the form of the hollow cylinder 2a, and the second portion in the form of the pair of parallel spaced walls 4b with the web 30, of exactly the same arrangement as their counterparts in the frame 1b' of FIGS. 11 and 12 or in the frame 1c' of FIG. 23.

The walls 4b of the caster frame 1d', however, are formed to include pairs of L-shaped flanges 70 and 71 along their lateral or vertical edges. These flange pairs 70 and 71 are adapted to slidably engage respective flanges 72 formed on the inner ends of the hubs 73 of the wheels 8b. These wheels can be of the same design as the wheels 8a of FIGS. 24 and 25 except for the flanges 72. Other details of construction, operation and manner of assemblage are exactly as above stated in connection with the preceding two adaptations of the invention.

Figures 29, 30, 31, 32:
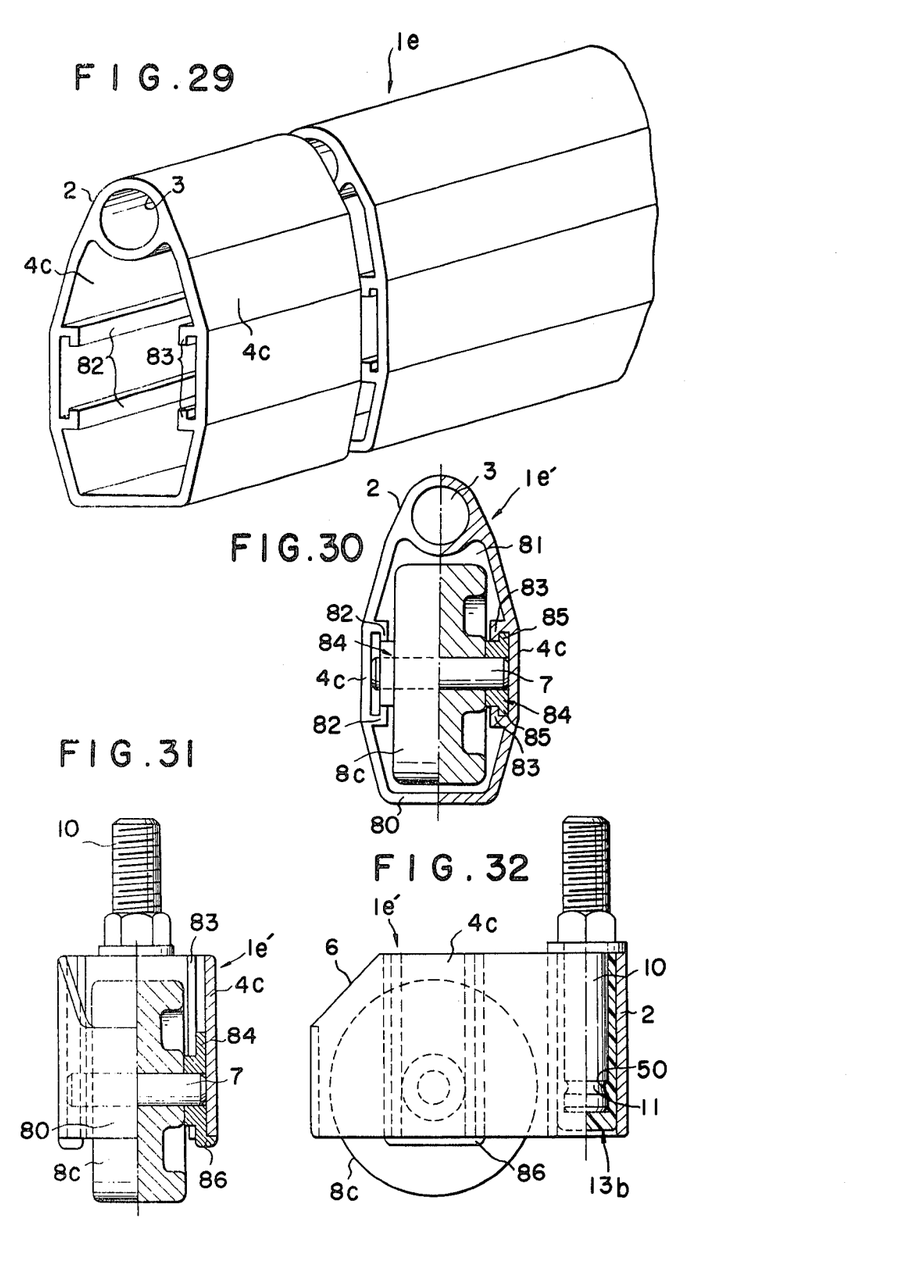
FIG. 29 is a view corresponding to FIG. 1 and showing a frame blank to be machined into a caster frame for use in a further preferred embodiment of the invention.
FIG. 30 is a plan view, half in horizontal section, of a caster produced by use of the frame blank of FIG. 29, the view not showing the connector rod.
FIG. 31 is an end elevational view, half in vertical section, of the caster of FIG. 30 complete with the connector rod.
FIG. 32 is a side elevational view, partly in vertical section, of the caster of FIG. 31.
Figure 33:
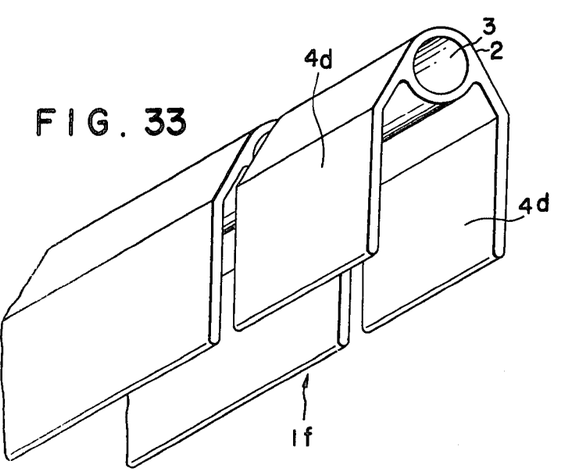
FIG. 33 is a view similar to FIG. 29 but showing a slightly modified example of the frame blank.
Figures 34, 36:
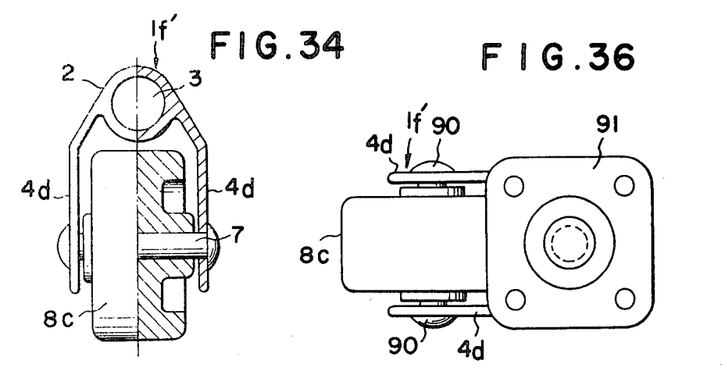
FIG. 34 is a plan view, half in horizontal section, of a caster produced by use of the frame blank of FIG. 33, the view not showing the connector rod.
FIG. 36 is a top plan view of the caster of FIG. 35.
Figure 35:
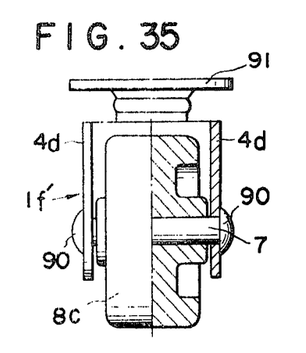
FIG. 35 is an end elevational view, half in vertical section, of the caster of FIG. 34 complete with the connector rod.

A further preferred embodiment of the invention shown in FIGS. 29 to 32, inclusive, incorporates a single wheel 8c enclosed within a frame 1e'. With particular reference to FIG. 29 the frame blank shown severed from an extruded section 1e consists essentially of the first portion 2 defining the hollow space 3 of circular cross section therethrough, and the second portion in the form of a pair of opposed walls 4c that are interconnected by a wall 80 extending between their lateral or longitudinal edges remote from the first portion 2.

As will be seen by referring also to FIGS. 30 and 31, the walls 4c with the connective wall 80 are adapted to bound a space 81 for accommodating the single wheel 8c. The walls 4c are formed to include pairs of opposed L-shaped flanges 82 and 83, respectively, that are arranged in corresponding positions on their confronting inside surfaces to engage and support a pair of axle bearings 84. For use of this frame blank as the caster frame 1e' its second portion may, if desired, by chamfered as indicated at 6 in FIG. 32. No other machining of the frame blank is necessary.

For assemblage the bearings 84 are mounted on the opposite ends of the axle 7 projecting out of the wheel 8c. As may be noted from FIGS. 30 and 31 each axle bearing 84 includes a pair of lateral flanges 85 and a bottom flange 86. The wheel 8c with its axle 7 and bearings 84 are then inserted into the space 81 in the second frame portion from below, with the lateral flanges 85 of the axle bearings fitted in the grooves formed by the respective pairs of L-shaped flanges 82 and 83 on the inside surfaces of the frame walls 4c. The wheel is forced into the space 81 until the bottom flanges 86 of the axle bearings move into abutting engagement with the bottom edges of the frame walls.

A connector bearing 13b, essentially similar to the bearing 13a shown in FIGS. 20 to 22, is inserted into the hollow space 3 in the first frame portion 2 from above. The connector rod 10 is then inserted into the bearing 13b. This connector rod is also shown to be exactly identical with that shown, for example, in FIGS. 15 and 16, having the annular groove 11 adjacent its bottom end for engagement with the constriction 50 of the bearing 13b.

Figure 37:
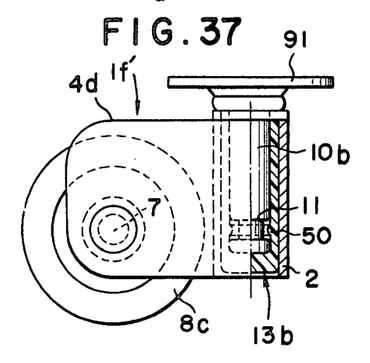
FIG. 37 is a side elevational view, partly in vertical section, of the caster of FIGS. 35 and 36.

FIGS. 33 to 37, inclusive, illustrate a modification of the FIGS. 29 to 32 embodiment. The frame blank shown severed from an extruded section 1f in FIG. 33 consists of the first portion 2 defining the hollow space 3 of circular cross section therethrough, and the second portion in the form of a pair of opposed walls 4d for accommodating the single wheel 8c therebetween. A pair of axle holes are formed in register through the opposed walls 4d for use of this blank as the caster frame 1f' seen in FIGS. 34 to 37. If desired, the corners of these walls 4d remote from the first frame portion 2 may be suitably rounded as best shown in FIG. 37.

For assemblage the axle 7 of the wheel 8c has its opposite ends inserted directly into the machined holes in the frame walls 4d and then heated at 90. A connector rod 10b inserted into the space 3 in the first frame portion 2 via the connector bearing 13b is shown to terminate at its top end in a mounting plate 91, it being understood that this connector rod is replaceable by other types of connectors disclosed herein. Other details are as set forth in connection with the FIGS. 29 to 32 embodiment.

A further preferred embodiment of the invention shown in FIGS. 38 to 42, inclusive, incorporates a chocking mechanism to hold an article to which the casters are attached in a desired position of installation against any possibility of accidental movement. As will be seen from FIGS. 38 and 39 an extruded section 1g for use in this embodiment is essentially identical with the section 1 of FIG. 1.

Figure 38:
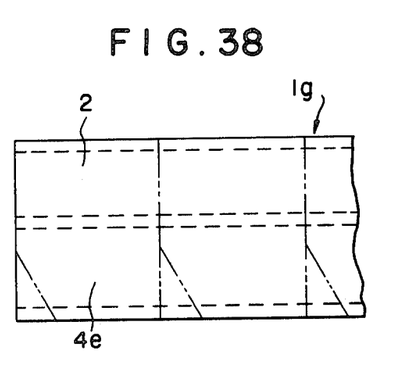
FIG. 38 is a fragmentary side elevational view of an extruded section for use in a further preferred embodiment of the invention.
Figure 39:
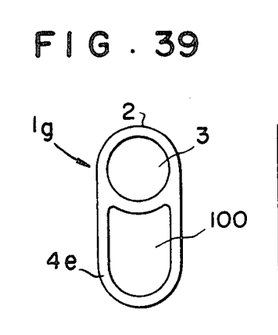
FIG. 39 is a cross sectional view of the extruded section of FIG. 38.

The desired frame blank, formed by cutting the extruded section 1g as indicated by the transverse dot-and-dash lines in FIG. 38, consists of the first portion 2 defining the hollow space 3 of circular cross section therethrough, and a second portion 4e having a hollow space 100 therethrough which is shown to be slightly different in cross sectional shape from the follow in the second portion 4 of the extruded section 1.

Figures 40, 41:
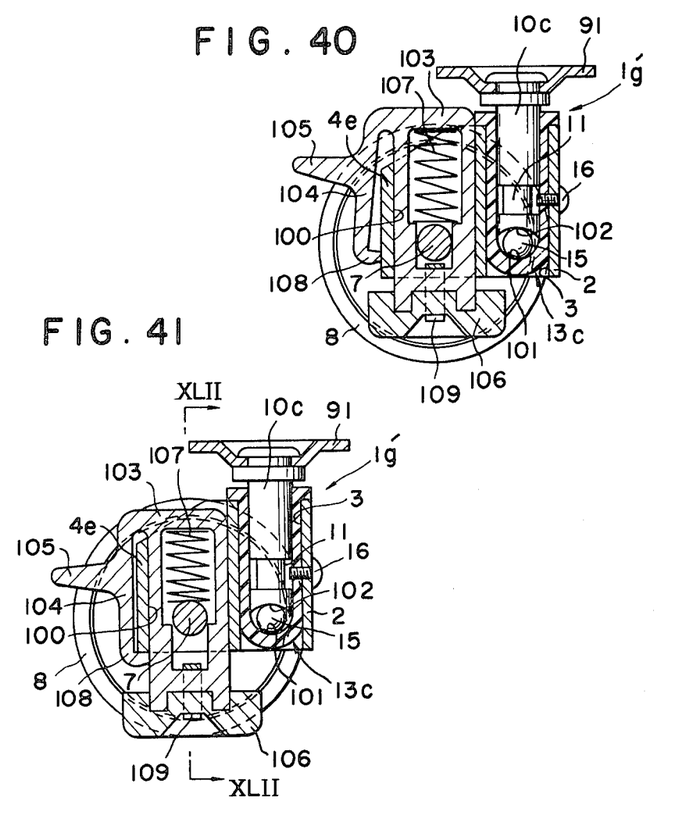
FIG. 40 is a vertical sectional view of a caster produced by use of the section of FIGS. 38 and 39, the caster including a chocking mechanism which is shown released.
FIG. 41 is a view similar to FIG. 40 but showing the chocking mechanism in its working position.
Figure 42:
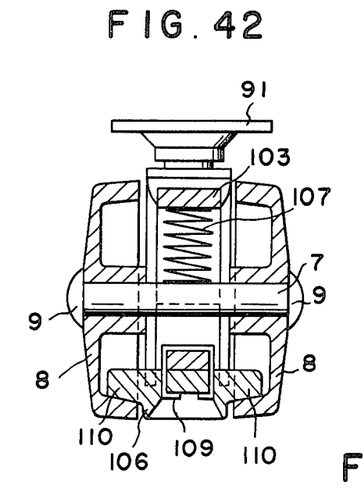
FIG. 42 is a sectional view taken along the plane of line XLII—XLII in FIG. 41.

This frame blank can be turned into a caster frame 1g' of FIGS. 40 to 42 by machining the axle holes through its second portion 4e and, if desired, by chamfering the second portion as indicated by the slanting dot-and-dash lines in FIG. 38.

As best seen in FIG. 42 the pair of wheels 8 used in this embodiment are also identical with those in the FIGS. 1 to 5 embodiment, and the axle 7 passing through the holes in the second frame portion 4e is shown headed at 9 to prevent detachment of the wheels mounted thereon.

A connector bearing 13c inserted into the hollow 3 in the first frame portion 2 is identical with that shown in FIG. 6 except that the bearing 13c has a concave bottom 101 on which is placed the ball 15. A connector rod 10c rotatably supported by this bearing 13c has a concave bottom end 102 resting on the ball 15 for smoother rotation relative to the bearing. Other details concerning the connector bearing 13c and connector rod 10c will be apparent from the foregoing description.

With reference generally to FIGS. 40 to 42 the chocking mechanism broadly comprises a carriage 103 integral with a locking pawl 104 and thumbpiece 105, and a chock 106 at the bottom end of the carriage. The carriage 103 is slidably fitted in the space 100 in the second frame portion 4e for up-and-down motion relative to the same and has a vertically elongated opening formed transversely therein so that the axle 7 may not interfere with the up-and-down motion of the carriage. Also accommodated in this opening is a helical compression spring 107 which engages the axle 7 at its bottom end to bias the carriage 103 upwardly of the caster frame 1g'.

Typically, the carriage 103 with its locking pawl 104 and thumbpiece 105 is integrally molded of polypropylene or like synthetic resin, in such a manner that the locking pawl is urged against the outer surface of the second frame portion 4e by its own inherent resiliency, as will be seen from FIG. 40. Thus, as illustrated in FIG. 41, the locking pawl 104 will have its terminal hook 108 in engagement with the bottom edge of the second frame portion 4e when the thumbpiece 105 projecting from the locking pawl is depressed against the bias of the compression spring 107.

The chock 106 is shown to be bound to the carriage 103 by a metal strip or wire at 109, although it is of course possible to employ threaded fasteners, adhesives, or other means for securing the chock to the carriage. This chock can be formed of rigid synthetic resin or metal with a wear resisting property higher than that of the wheels 8 made, for example, of nylon or polypropylene. The chock may be molded complete with the apertures for the passage of the binding strip or wire.

When the carriage 103 is in the depressed position of FIG. 41, the chock 106 is forced against the flooring surface. In the illustrated embodiment of the invention the chock is formed integral with a pair of brake shoes 110 arranged to move into and out of frictional engagement with the rims of the respective wheels 8.

For actuation of the chocking mechanism the operator may use his thumb or, if desired, toe to depress the thumbpiece 105 against the bias of the compression spring 107 until the terminal hook 108 of the locking pawl 104 engages the bottom edge of the second frame portion 4e by its own resiliency. The carriage 103 is then locked in the depressed position of FIGS. 41 and 42, and the chock 106 is forced against the flooring surface while its brake shoes 110 are forced against the respective wheel rims. The article to which the caster is attached is now immovable.

The chock can be released by manipulating the thumbpiece 105 so as to move the terminal hook 108 of the locking pawl 104 out of engagement with the bottom edge of the second frame portion 4e. The carriage 103 will then rise from its position of FIGS. 41 and 42 back to the FIG. 40 position under the influence of the compression spring 107, thereby raising the chock 106 and shoes 110 out of contact with the flooring and wheel rims respectively.

Figure 43:
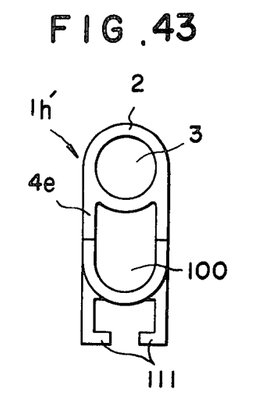
FIG. 43 is a top plan view showing a slight modification of the caster frame of FIGS. 40 to 42.
Figure 44:
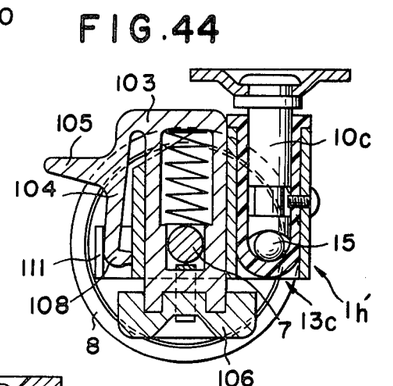
FIG. 44 is a vertical sectional view of a caster produced by use of the frame of FIG. 43, in which the chocking mechanism is shown released.
Figure 45:
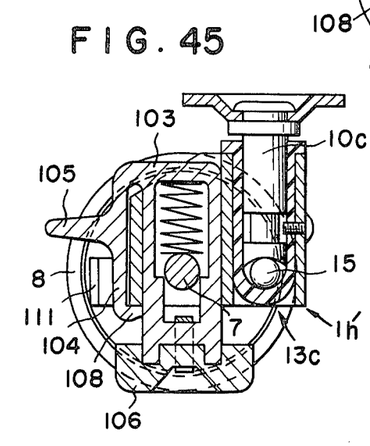
FIG. 45 is a view similar to FIG. 44 but showing the chocking mechanism in its working position.

In a slight modification of the preceding embodiment shown in FIGS. 43, 44 and 45, the caster frame 1h' is formed to include a pair of limit stops 111 projecting outwardly from the second frame 4e. These limit stops are designed to coact to limit the swinging motion of the locking pawl 104 away from the second frame portion 4e in the act of releasing the chock. This arrangement is preferable because, were it not for the limit stops 111, the locking pawl might be broken off from the carriage 103 as a result of exertion of excessive manual effort on the thumbpiece 105. Other details are exactly identical with those set forth in conjunction with the FIGS. 38 to 42 embodiment.

I claim:

1. A method of producing caster supporting frames having a first end portion with a hollow space therethrough for receiving therein an upright connector rod, and a second end portion for supporting a horizontal axle of a caster wheel or wheels, said method comprising the steps of:

shaping a bar-like rod or uniform cross-sectional configuration to have along one side thereof a first through hole extending longitudinally therethrough and along the other side thereof a second through hole extending longitudinally therethrough parallel to said first through hole; and cutting said bar-like rod transverse to the longitudinal length thereof into a number of pieces of a predetermined length to obtain the caster supporting frames, whereby said first through hole forms said hollow space of said first end portion and said second end portion is also hollow therethrough.

2. The method as recited in claim 1 wherein said first through hole in the bar-like rod is of circular cross-section.

3. The method as recited in claim 1 wherein said bar-like rod is of elongated shape in cross-section and has at least one pair of rounded longitudinal edges.

4. The method as recited in claim 1 wherein said bar-like rod is of a uniform thickness in cross-section.

* * * * *